United States Patent [19]
Krein et al.

[11] Patent Number: 5,668,464
[45] Date of Patent: Sep. 16, 1997

[54] FEEDFORWARD ACTIVE FILTER FOR OUTPUT RIPPLE CANCELLATION IN SWITCHING POWER CONVERTERS

[75] Inventors: Philip T. Krein; Pallab Midya, both of Champaign, Ill.

[73] Assignee: The Board of Trustees of the University of Illinois, Urbana, Ill.

[21] Appl. No.: 736,787

[22] Filed: Oct. 25, 1996

Related U.S. Application Data

[63] Continuation of Ser. No. 329,448, Oct. 26, 1994, abandoned.

[51] Int. Cl.$^6$ .................................................. G05F 1/24
[52] U.S. Cl. ........................ 323/259; 323/282; 363/46
[58] Field of Search ................................. 323/249, 259, 323/282; 363/45, 46

[56] References Cited

U.S. PATENT DOCUMENTS

| | | | |
|---|---|---|---|
| 4,594,648 | 6/1986 | Gallios | 363/46 |
| 4,835,411 | 5/1989 | Takeda | 307/105 |
| 5,343,380 | 8/1994 | Champlin | 363/46 |
| 5,513,092 | 4/1996 | Goebel | 363/84 |

OTHER PUBLICATIONS

Hasler AG. General Feed–forward Input Filter Compensation Method. IEEE Power Electronics Specialist. Jun. 1993. 300–305.

Kelkar S and Lee FC. Adaptive Input Filter Compensation for Switching Regulators. IEEE Transactions on Aerospace and Electronic Systems. AES–20(1)57–66. Jan. 1984.

*A New Feedforward Control technique for AC/DC Switch-mode Power Supplies*, Dewan et al., Proc. IEEE APEC, 376–382, Mar. 1992.

*Dual Switch Mode Power Converter*, Midya et al., IEEE IECON, 155–158, Mar. 1989.

*A Novel Active Power Filter for Reactive Power Compensation and Harmonic Suppression*, Jou et al., Int. J. Electronics, vol. 75, No. 3, 577–587, Jul. 1993.

*Development of Active Filter with Series Resonant Circuit*, Nakajima et al., IEEE PESC, 1168–1173, Apr. 1988.

*Coupled Inductor Boost Converter with Input and Output Ripple Cancellation*, martinelli et al., IEEE, 567–572, Jun. 1991.

*Modeling and Simulation of a Digitally Controlled Active Rectifier for Power Conditioning*, Hudson et al., IEEE, 423–429, Jun. 1991.

*Analysis and Control of Active Power Filter with Optimized Injection*, Choe et al., IEEE Transactions On Power Electronics, vol. 4, No. 4, 427–433, Oct. 1989.

*Primary Examiner*—Jeffrey L. Sterrett
*Attorney, Agent, or Firm*—Greer, Burns & Crain, Ltd.

[57] ABSTRACT

An active filter provides ripple cancellation in a DC-DC converter. The feedforward filter applies to any converter with an output filter inductor. The filter is inherently stable, performs in both continuous and discontinuous conduction modes, and applies to resonant converters. A suitable linear amplifier, combined with a current transformer, results in a low loss implementation. An adaptive tuning scheme compensates for inductance variation and drift. The filter is usable with buck, push-pull, and boost converter topologies. The result is output ripple below 10 $mV_{RMS}$. The filter is effective on converters with outputs as low as 2 V and currents beyond 30 A.

10 Claims, 10 Drawing Sheets

FEEDFORWARD ACTIVE FILTER FOR OUTPUT RIPPLE CANCELLATION IN SWITCHING POWER CONVERTERS

RELATED APPLICATION

This is a continuation of application Ser. No. 08/329,448, filed on Oct. 26, 1994 abandoned.

FIELD OF THE INVENTION

The invention pertains to switching power converters. More particularly, the invention pertains to such converters which incorporate feedforward active filters.

BACKGROUND OF THE INVENTION

Switching power converters convert energy from an electrical source, such as an AC wall plug, to a form needed by an electrical load, such as a computer, appliance, or electronic circuit. Switching action provides very high efficiency, but introduces ripple and electrical noise.

In commercially available converters, filter networks built from capacitors and inductors must be used to bring ripple to a tolerable level. In some circuits, especially those rated below 5 V, effective filters are very difficult to build with affordable components.

Known switching power converters use one or two types of filter arrangements. Passive filters are built from inductors and capacitors. These are relatively large, since the components must store sufficient energy to offset ripple and noise. The inherent series resistance inside any real capacitor or inductor makes it almost impossible to meet the needs of very demanding applications.

Passive filters trade off quality for dynamic performance. It is well known in the field that switching converters rarely provide output ripple below 50 mV. This is 1% of the nominal output for a 5 V supply, and much more for emerging 3.3 V and 2 V applications. or applications demanding battery quality, so-called "linear supplies" are often used. These are much less efficient and far larger than switching supplies of similar ratings.

Figure 1A:
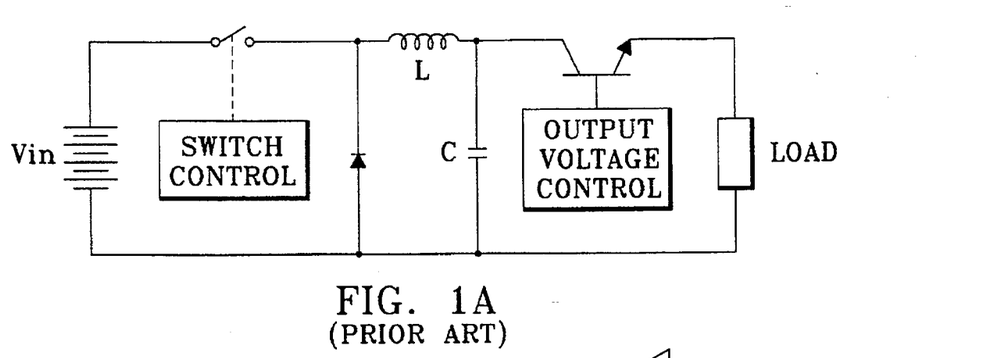
FIG. 1A is a schematic of a known series active filter.

Active filters add an electronic circuit that modifies the output to reduce ripple. The most common active filters are the series type as illustrated in FIG. 1A. A transistor coupled in series with the output actively adjusts the voltage presented to the load.

Series active filters offer excellent performance, but sacrifice efficiency. In a typical 5 V application of a series active filter, the overall converter efficiency is reduced by nearly 30%. In a 2 V application, 50% reduction is likely. In spite of these extra losses, series active filters are widely used in the marketplace because of their high performance.

An alternative active filter arrangement uses a parallel connection. In this case, an amplifier injects a compensation current into the load. Known active filters use this method with output feedback.

Output feedback has limited ability to cancel ripple, and gives rise to stability problems. Most important, the more effective a feedback-based filter becomes, the more gain it requires to function. This inherently trades off stability and performance.

Figure 1B:
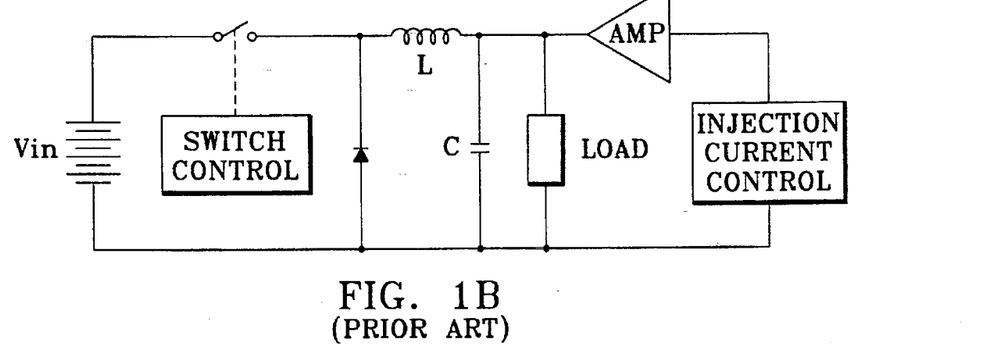
FIG. 1B is a schematic of a known parallel active filter.

In FIG. 1A, the entire output current flows through the active element. A known parallel arrangement, shown in FIG. 1B, injects a compensation current into the output node. The series active filter is familiar and has wide commercial use, and provides performance similar to that of a linear power supply. The series voltage drop sacrifices efficiency, but the method offers good output behavior when current levels are not high.

One straightforward output active filter approach is to use output voltage feedback to drive a compensation amplifier or switching converter. The output is compared to a reference value, and proportional-integral loops are used to provide ripple correction (as in FIG. 1B).

Ripple cancellation has been accomplished for a buck converter using a linear amplifier to inject the compensation current into the output node. This approach has inherent stability problems. The load impedance is often unknown and variable.

If the ripple voltage is on the order of noise levels in the system, it is hard to sense the output ripple with sufficient accuracy. These drawbacks mean that an active filter stable under a given set of conditions is not guaranteed to be stable under changing loads or when noise levels are high.

Active filter approaches for DC-DC converters, as described in the literature, do not take advantage of knowledge of the ripple behavior. For example, the ideal current ripple in a simple buck converter is triangular, while the output ripple in a resonant converter is sinusoidal.

Thus, there continues to be a need for filters usable to improve the performance of converter circuits. Preferably, knowledge of ripple behavior could be incorporated into such filters so as to improve converter performance. In addition, it would be desirable if such filters did not substantially increase the cost, size or weight of converter circuits.

SUMMARY OF THE INVENTION

In accordance with the invention, in one embodiment, a parallel active filter is incorporated into a switching power converter. The filter reduces ripple by injecting a cancellation current into the electrical load. The cancellation current is equal and opposite to an estimated ripple current.

The estimated ripple current is produced by integration of an inductor voltage within the converter circuit. This feedforward arrangement avoids stability problems, and is very simple to implement.

An adaptive tuning circuit can be incorporated into the filter. This tuning circuit maintains good ripple cancellation over a wide range of output loads and operating conditions.

Filters in accordance with the invention are applicable to virtually all types of DC power supplies and DC-DC converters, especially those for 5 V output and lower. The present method is directly applicable to high-density DC-DC converters.

The filter uses feedforward of an internal converter voltage to determine the necessary ripple compensation current in one embodiment. This requires no special sensors, and is inherently stable. There is no tradeoff between stability and performance. The more effective the filter becomes, the better the method functions.

The present method can complement passive filtering by improving the signals imposed on extra output filter states. The parallel approach is extremely efficient: overall converter efficiency is reduced only about 1% for typical arrangements, even for 2 V outputs.

Feedforward requires sensing of an inductor voltage, and assumes knowledge of the inductor value. An adaptive tuning scheme can be included so that the active filter can perform without measurement of the inductor value. Ripple suppression of 15 dB or more has been demonstrated.

Since in one embodiment the feedforward method uses an internal voltage for its operation, it accommodates virtually any power supply topology. This has been a problem in previous active filter implementations.

Common commercial converters have square wave, triangle wave, or sine wave internal signals. The present feedforward method compensates automatically for any given waveform, and does not require optimization for a specific narrow range of signals. This is an important advantage in connection with new resonant circuits used for conversion. Many such circuits adjust their output by altering the switching frequency. A passive filter cannot be optimized if the switching frequency changes, but an active filter in accordance with the present invention has no trouble with frequency variation.

Ripple reduction of 15 dB with only 1% efficiency reduction represents a major breakthrough in active filters for power converters. The idea of integrating an internal waveform offers simplicity, reliability, and good performance.

The present filter is especially advantageous in that it requires only a few components, including an operational amplifier, a current buffer, and a small current transformer in one embodiment. The electronic elements can be incorporated into commercial integrated circuits used for switching converter control. The implementation potentially costs less than a passive filter with similar ratings.

A feedforward approach to active filters in accordance with the present invention offers robust ripple cancellation under all converter loading and noise conditions. Knowledge of the converter's ideal output ripple current is used to create an estimated compensation waveform.

When this compensation waveform is injected (by means of a current transformer, for example), the net result is a near-zero output ripple. Since the converter's uncorrected output ripple waveform is used to generate the estimate, the compensation is as stable as the converter itself, and cannot be compromised by measurement problems at the output.

In an alternate embodiment, current variations can be detected at a capacitor. The current variations can be processed, for example by integration, and converted to a compensating voltage. The compensating voltage can be coupled in series with the load.

These and other respects and attributes of the present invention will be discussed with reference to the following drawings and accompanying specification.

DETAILED DESCRIPTION OF THE PREFERRED EMBODIMENTS

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

Most DC-DC converters have an expected ripple current that can be calculated from the switching voltages in the circuit. In a simple buck converter, for example, the square wave imposed on the output inductor leads to a triangular current ripple. This ripple is a function of the average load current, but will not be affected significantly by other filtering stages. If a compensation current is injected at the inductor output, the current ripple will be cancelled. In essence, the expected current ripple is to be constructed. Then, its inverse is used to control a compensation current source.

Figure 2:
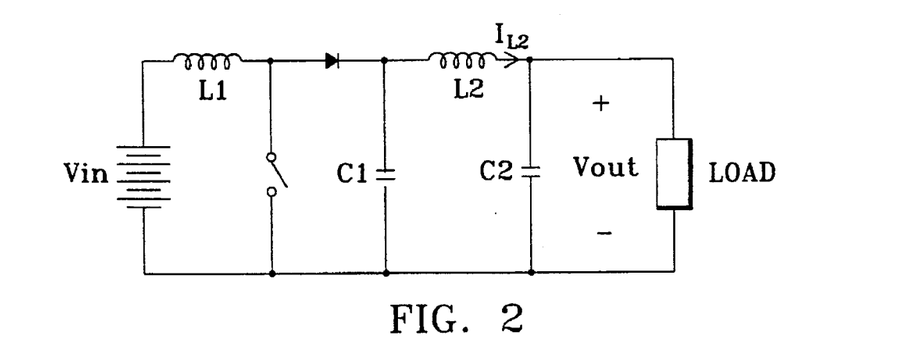
FIG. 2 is a schematic of a known booster converter with an L-C output filter stage.

Consider a converter topology with an inductor in the power output stage as in FIG. 2. The inductor current is, of course, $$\frac{di}{dt} = \frac{(V_i - V_{out})}{L}$$

Equation No. 1

The voltage $V_{out}$ is intended to be perfectly constant, so it can be said that the input voltage $V_i$ is the primary contributor to the AC content of the inductor current. Thus the integral of $V_i$ provides an accurate estimate of the ripple current, if the inductance is known.

The ripple current at $V_{out}$ is to be cancelled. Hence, the assumption that $V_i$ dominates the AC current content will be more accurate once the compensator is in operation. The voltage $V_i$ has very high AC content compared to the output, and will be relatively easy to sense. The integration procedure is inherently insensitive to high-frequency noise in $V_i$, and so offers an estimate of the inductor's ripple current with no knowledge of the load and minimal knowledge of the system arrangement.

The integrator places no requirements on the form of $V_i$. In a buck converter, the voltage will be a square wave. In FIG. 2, the voltage across $L_2$ is approximately triangular. In a resonant converter, it would be most likely be sinusoidal. In all cases $V_i$ shows large-signal variation, and the process of sensing and integrating it will be straightforward. The compensation current is computed directly from the integral, $$i_{comp} = -\frac{1}{L} \int V_i dt$$

Equation No. 2

Figure 3:
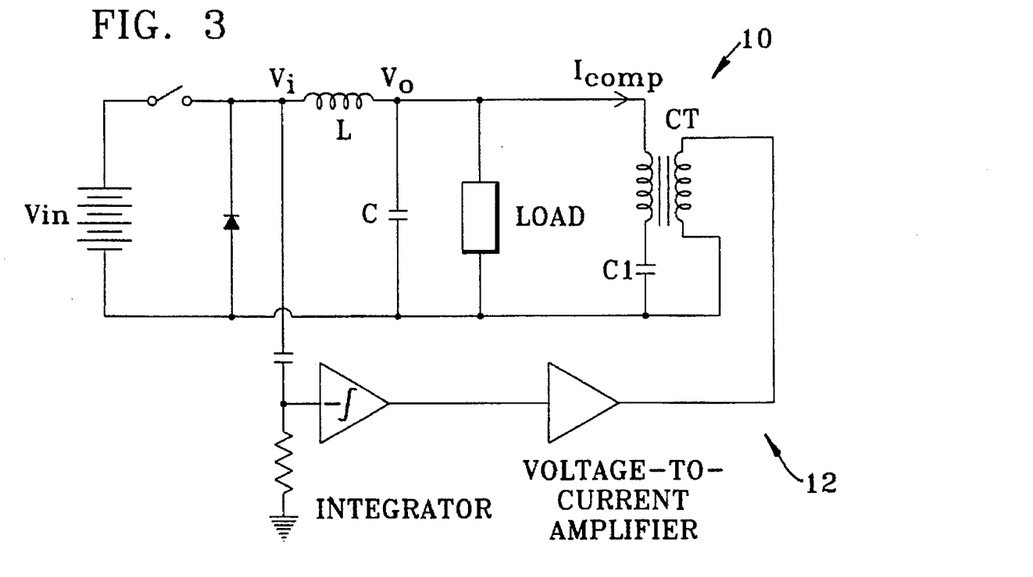
FIG. 3 is a schematic of feedforward active filter with a buck converter in accordance with the present invention.

The integration can be scaled in any convenient way to accommodate OP-AMPS or other linear circuit components. The current $i_{comp}$ is injected at $V_{out}$, either through a capacitor or with a current transformer (CT). A block diagram of a converter 10 in accordance with the present invention is illustrated in FIG. 3. A buck converter has been modified to incorporate a feedforward active filter 12.

Figure 4:
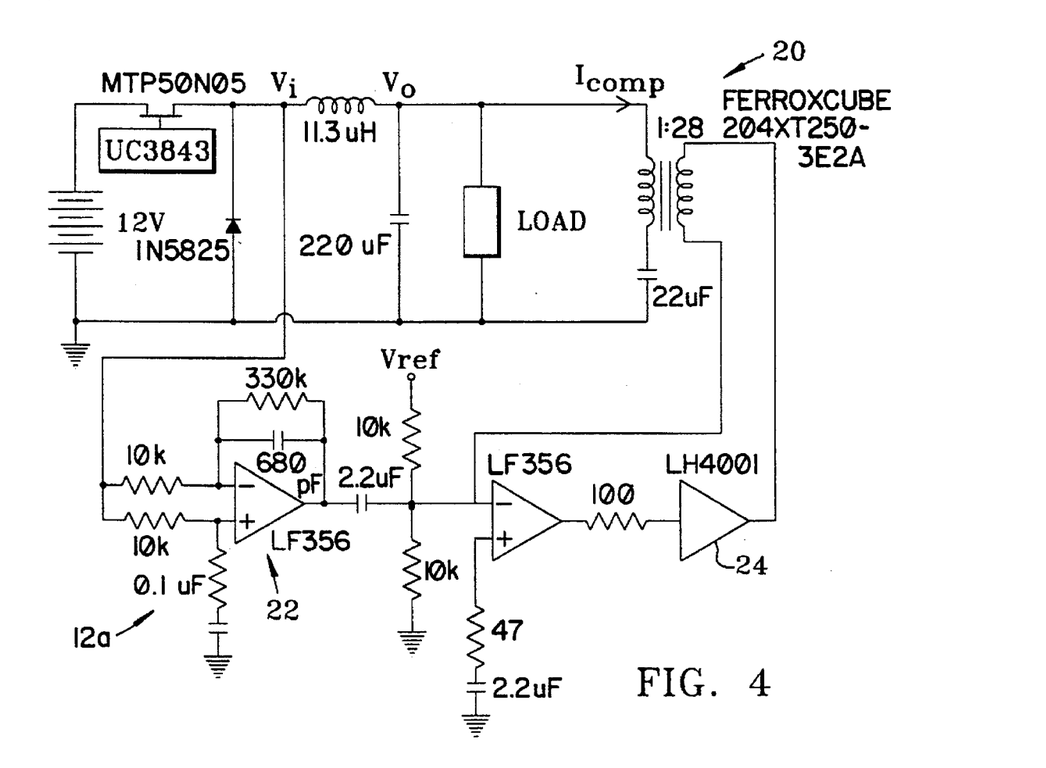
FIG. 4 is a schematic of a 12 V to 5 V buck converter with feedforward active filter in accordance with the present invention.

The desired compensation information should address only the AC content of the output. The integral (2) grows without bound, for example. This contrasts with the net inductor voltage, $V_i - V_{out}$, which has zero average. The feedforward compensation method thus requires AC coupling at both the input and output. Output coupling is simple, the compensation in FIG. 3 is injected through capacitor $C_1$. The main DC current in the converter has no effect on the compensator. The integrator input also must be AC coupled. FIG. 3 illustrates the principles of this circuit. A complete circuit implementing a feedforward active filter is illustrated in FIG. 4.

As in any active filtering scheme, the feedforward compensation process requires some power. However, in the proposed arrangement, the current is injected into a fixed voltage bus, and the average power requirement is identically zero. As long as the output impedance of the compensation circuit is very low, the compensation power can be made arbitrarily small. In practice, the compensator impedance is usually determined by the ESR of the coupling capacitor, shown in $C_1$ in FIG. 3. In any case, the compensation power can be kept small even when $i_{comp}$ is a substantial fraction of the load current.

Consider, for example, a compensator with capacitor output ESR of 0.05 Ω, designed for a converter with 30 A nominal output current into a 5 V load. If the inductor AC current ripple is on the order of 12 $A_{p-p}$, the loss in the ESR will be about 0.9 W. If the compensator has a CT ratio of 15:1, the compensation circuit must supply 0.8 $A_{p-p}$. If it uses a 12 V supply rail, the power input to the compensator will be approximately 2.4 W, compared to the converter output power of 150 W.

Compensation power can be reduced by changing the CT turns ratio a or matching the compensator supply rail closely to the worst-case requirement. The lowest allowable compensation rail would just exceed that needed to overcome the ESR referred to the CT high side, $$V_{rail} \geq a R_{ESR} i_{comp(peak)} \quad \text{Equation No. 3}$$

If the turns ratio and rail voltage are optimized precisely, the compensation power for a sinusoidal ripple current will be $$P_{comp} = \frac{4}{\pi} R_{ESR} i_{comp(RMS)}^2 \quad \text{Equation No. 4}$$

plus power for the OP-AMPS. If the ripple current is initially 10% or less, the compensation power can be as low as 1% of the nominal output power even if the ESR is nearly as large as the converter load resistance. The turns ratio offers an extra degree of freedom compared to a passive filter design. This is helpful in selecting a coupling capacitor, the capacitance value can be chosen to minimize ESR, while the CT ratio can adjust to match the reactance.

If the converter load becomes too light, the inductor current will reach zero during an unknown portion of each cycle. When this occurs, the voltage $V_i$ will equal $V_{out}$, and the integrator AC input will be zero. This creates no problems, since the integral is still a valid representation of the shape of the inductor current. The current $i_{comp}$ will still be computed correctly, and the active filter still operates to cancel the ripple. Thus, the actual shape of the inductor current waveform is always computed properly by the integrator, and the compensator handles discontinuous mode without any problems.

The only system parameter used in the technique is the inductor value L. The actual setting of the integrator represents an estimate $L_{est}$ which might differ from the actual value. The current $i_{comp}$ computed by the circuit will differ from the ideal compensation current by an error current $i_{err}$, $$i_{err} = \frac{-1}{L_{est}} \int V_i dt - \frac{-1}{L} \int V_i dt \quad \text{Equation No. 5}$$

Notice that (5) can never lead to instability. Instead, it will give a performance degradation. The ripple will be compensated to at least some degree unless the parameter error is extreme. Of course, the best performance is obtained when $L_{est} = L$. The ratio of compensated output ripple current relative to the ripple without compensation, in a system with possible error in $L_{est}$ is simply $$\frac{i_{ripple}(\text{comp})}{i_{ripple}(\text{no comp})} = \left(1 - \frac{L}{L_{est}}\right) \quad \text{Equation No. 6}$$

If the estimate errs by less than 50%, compensation will improve the output ripple.

In a practical converter, the filter inductance will vary with DC current, temperature, manufacturing tolerances, and other factors. To accommodate parameter error in L an adaptive gain is introduced. The ideal value for k is $L/L_{est}$, and the compensation process with this gain can be represented as $$i_{comp} = -k \int \frac{V_i}{L_{est}} dt \quad \text{Equation No. 7}$$

When the system is tuned exactly, any residual ripple is uncorrelated to the compensation current. This property is used to adjust k. To develop a tuning approach, the ripple voltage is first expressed as a function of the impedance at the output point (load plus extra filter stages), Z, and the sum of the AC portion of the inductor current and the compensation current, $$V_{ripple} = Z(i_{ac} + i_{comp}) = Z\left(1 - \frac{kL}{L_{est}}\right) i_{ac} \quad \text{Equation No. 8}$$

A correlation product C of the ripple voltage and the nominal compensation current is calculated as $$C = V_{ripple} \int \frac{V_i}{L_{est}} dt = \frac{L_{est}}{L} i_{ac}^2 \left(1 - \frac{kL}{L_{est}}\right) Z \quad \text{Equation No. 9}$$

This is a measure of the error in k. In particular, the polarity of C indicates whether k needs to increase or decrease, so the DC component of C gives a direct signal for adapting k. An integral feedback of C seems most appropriate for the correction. This will force the cross-correlation between the residual ripple and the compensation current to zero in steady state. A value C=0 implies that the compensator is doing the best possible job.

The dynamic-adjustment of k through an integral control suggests the differential equation $$\frac{dk}{dt} = \frac{P}{T} = \frac{L_{est}}{LT} i_{ac}^2 \left(1 - \frac{kL}{L_{est}}\right) Z \quad \text{Equation No. 10}$$

Figure 5:
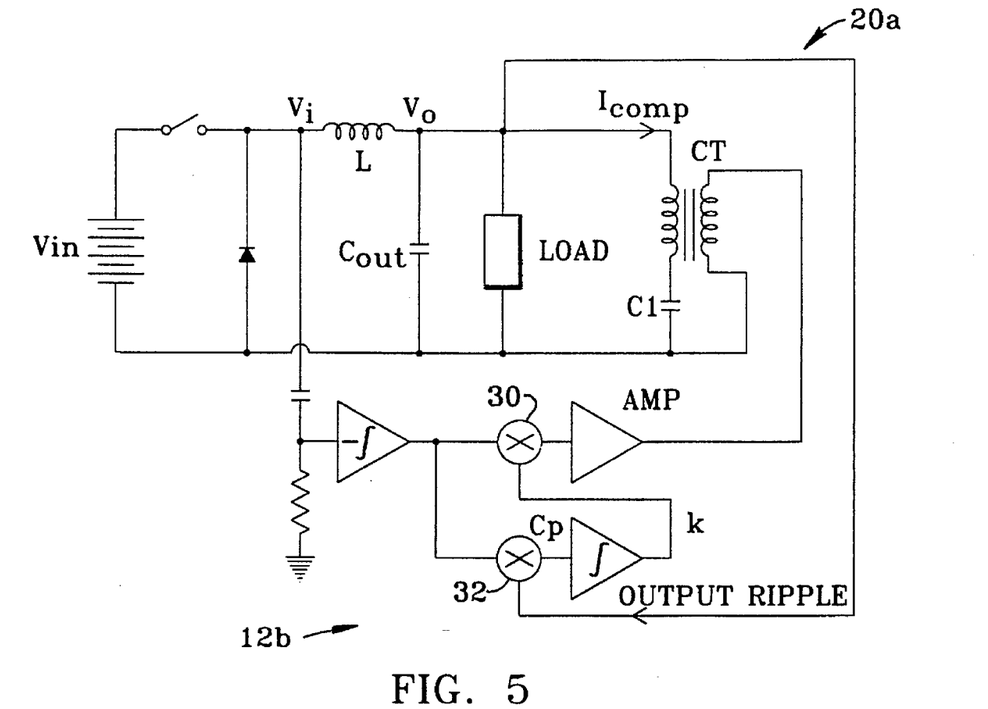
FIG. 5 is a schematic of a buck converter which incorporates adaptive gain to accommodate inductance variation.

This first-order equation in k is stable for any load with positive real part, with a rate of convergence determined by the integration time constant T. FIG. 5 illustrates a buck converter with an adaptive compensator. Two multipliers and a second integrator have been added to the non-adaptive form in FIG. 4.

A buck converter 20, illustrated in FIG. 4 was designed for 12 V input and 5 V output at up to 70 W. A feedforward active filter 12a was used in an initial evaluation of the feedforward compensation technique. In this application, it is hard to keep the ripple below ±1% with conventional filtering.

In FIG. 4 an OP-AMP integrator 22 is AC coupled to a current driver 24. The driver 24, an LH4001 buffer, provides high slew rates at output currents up to several hundred milliamps.

Figure 6:
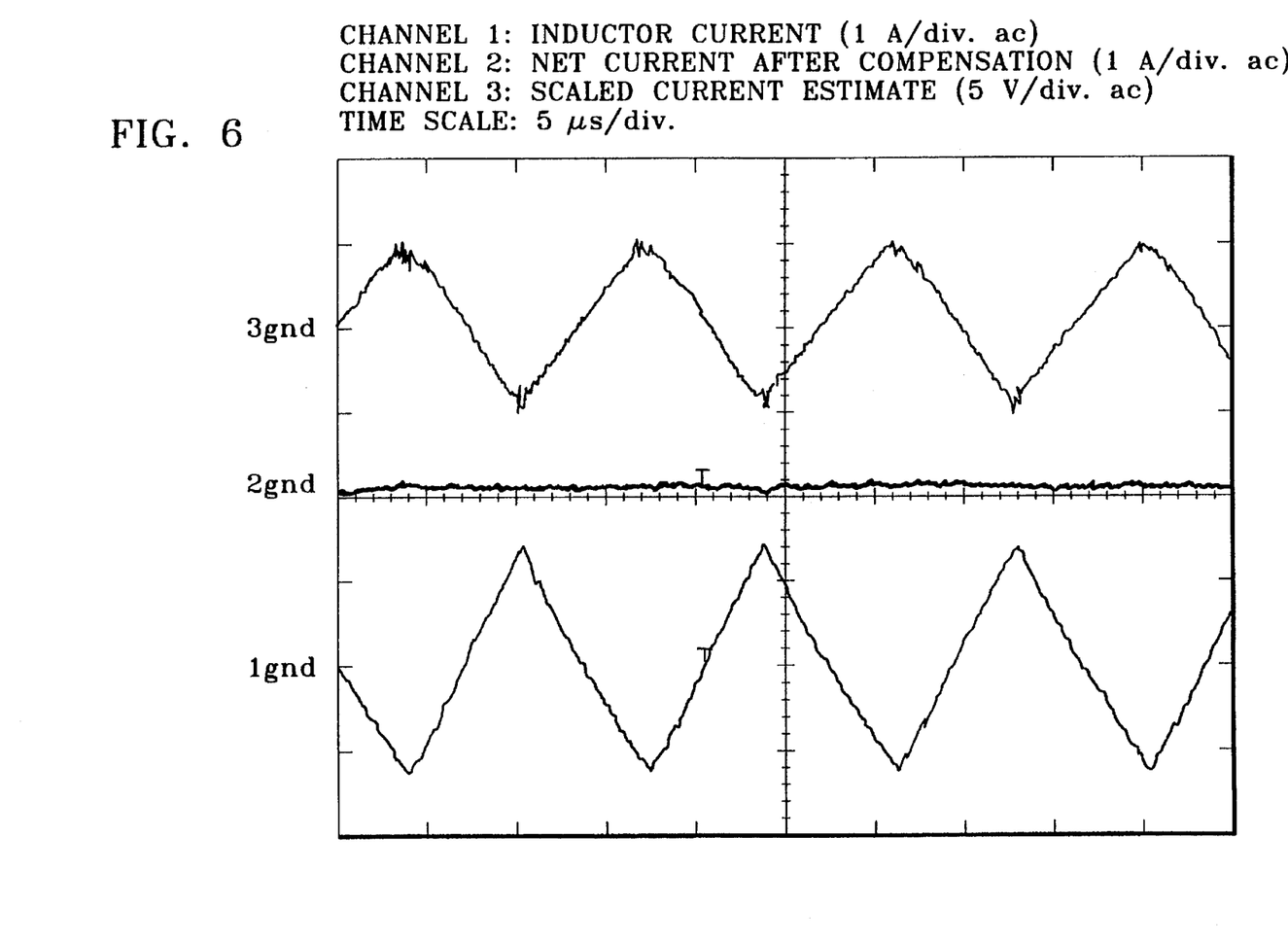
FIG. 6 is a graph of a inductor current, compensation current, and net result for the buck converter of FIG. 4.

FIG. 6 is an oscillogram taken from the circuit 20 at full load. The bottom trace is the AC portion of the inductor current, showing 2.8 $A_{p-p}$ of ripple. The top trace shows the signal at the integrator output—the inverted estimate of the triangular waveform. Bandwidth limitations affect the fidelity near the current peaks. The center trace shows the net converter current, with the compensation active. Current ripple injected into the output capacitor and load combination has been reduced by about two orders of magnitude.

Figure 7:
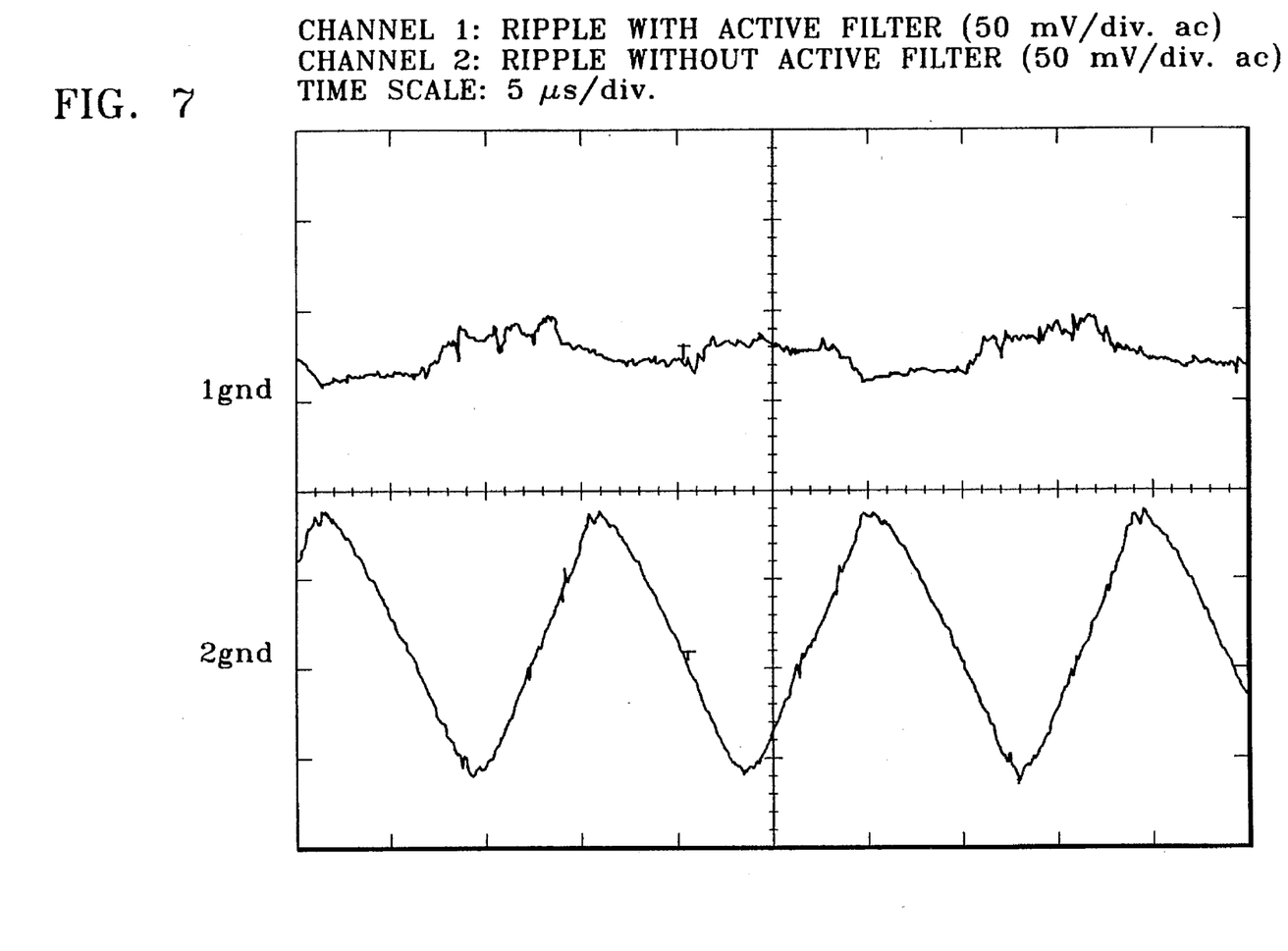
FIG. 7 is a graph of compensated and uncompensated output ripple voltage for the buck converter of FIG. 4.

The output also improves as illustrated in FIG. 7. With a 70 W load, but without compensation, the output ripple is nearly 150 $mV_{p-p}$. When the compensation circuit is used, the ripple drops to about 40 $mV_{p-p}$. The residual ripple is no longer triangular, reflecting the near-complete cancellation of the dominant ripple components.

FIGS. 6 and 7 demonstrate the effectiveness of the feedforward active filter 12a; however, the variation of L over the converter load range limits filter performance in this example. An adaptive scheme was implemented as in FIG. 5 in a modified filter 12b. In the filter 12b, two Analog Devices AD633 multipliers 30, 32, have been incorporated into the filter 12a.

Table I compares results for the buck converter 20a at loads up to 70 W. The active filter 12b can be adjusted for optimum performance at a specific load level. For example, it gives about a 16:1 output voltage ripple reduction ratio under the best conditions, an 11 A load. The adaptive tuning loop cannot do quite as well, but gives consistent voltage ripple reduction ratios of about 7:1 over the entire load range. As the Table illustrates, the RMS ripple was brought below 8 mV in this example.

TABLE I

Output Ripple in 12 V to 5 V Buck Converter

| Load Current (A dc) | Ripple Voltage (no active filter) | Ripple Voltage (filter without adaptive gain) | Ripple Voltage (filter with adaptive gain) |
|---|---|---|---|
| 0 A | 29.6 $mV_{RMS}$ | 3.5 $mV_{RMS}$ | 4.1 $mV_{RMS}$ |
| 1 | 32.4 | 13.6 | 4.5 |
| 2 | 34.9 | 13.7 | 5.3 |
| 3 | 36.9 | 13.1 | 5.0 |
| 4 | 38.7 | 12.3 | 5.3 |
| 5 | 40.4 | 11.3 | 6.1 |
| 6 | 42.1 | 10.2 | 6.2 |
| 7 | 42.0 | 8.8 | 7.3 |
| 8 | 46.0 | 7.3 | 7.3 |
| 9 | 47.9 | 5.7 | 7.1 |
| 10 | 49.7 | 4.0 | 7.4 |
| 11 | 51.5 | 3.2 | 7.4 |
| 12 | 53.0 | 3.6 | 6.5 |
| 13 | 55.2 | 6.5 | 6.5 |
| 14 | 56.9 | 8.2 | 6.9 |

The time constant of the tuning process is large to ensure no interaction with noisy signals. In this case, a 1 ms loop time constant was selected, compared to the 10 μs switching period. After large load swings, this tuning scheme will recover quickly.

Figure 8:
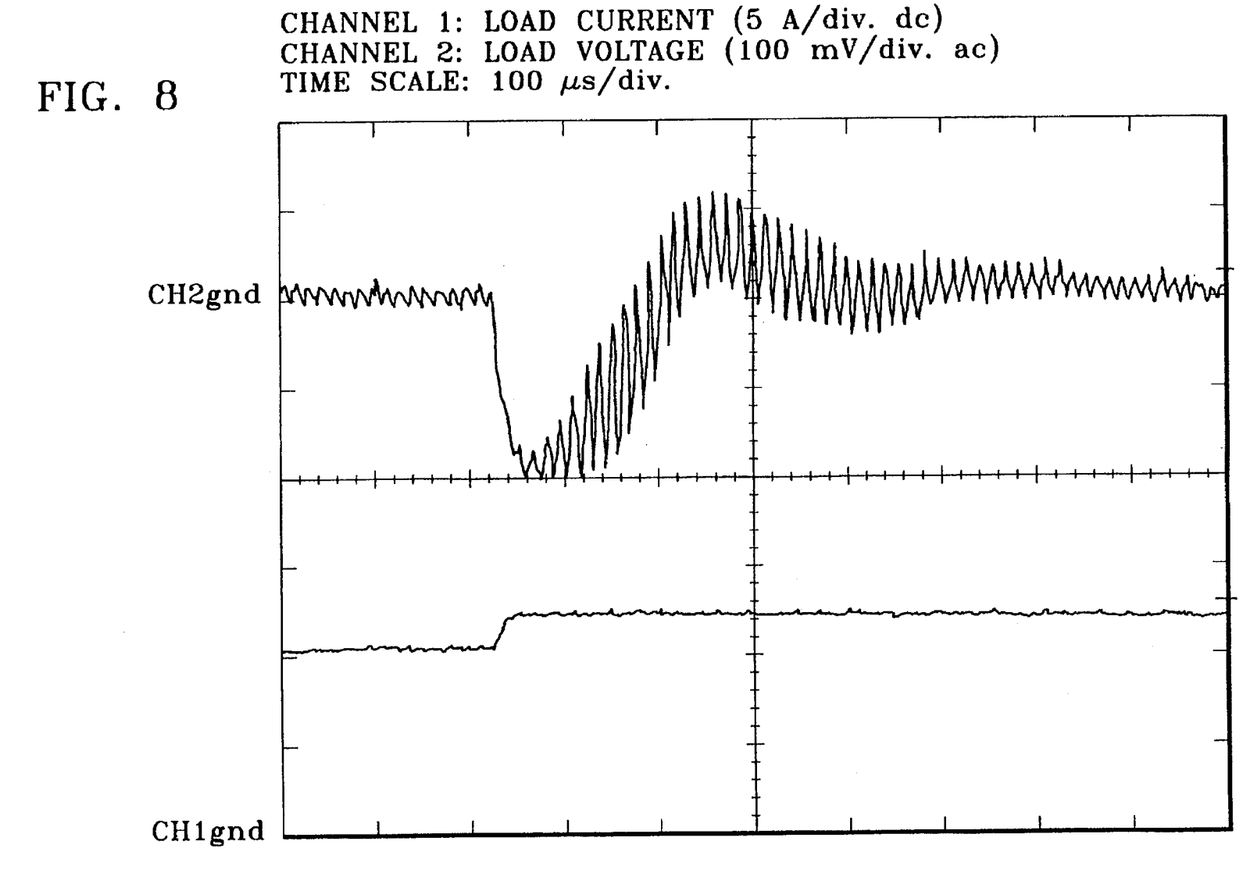
FIG. 8 is a graph of adaptive gain response to a load current step for the converter of FIG. 4.

FIG. 8 illustrates an example for a 10 A to 12 A load current step. The ripple is initially about 30 $mV_{p-p}$, and increases after the load step. Within 800 μs, the ripple has been compensated, again to a level of about 30 $mV_{p-p}$. The active filter in this circuit consumed a maximum of 0.75 W.

Figure 9:
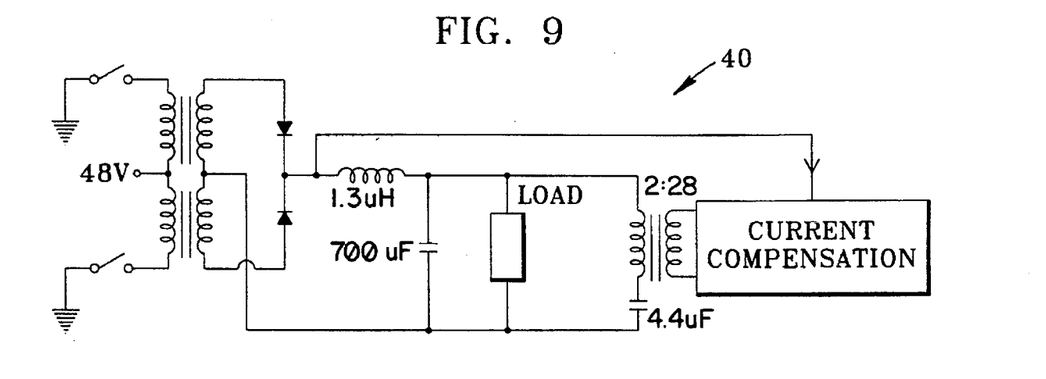
FIG. 9 is a schematic of a push-pull forward converter with an active filter.

FIG. 9 illustrates a push-pull forward converter 40. While the basic behavior is essentially the same as in a buck converter, leakage inductance and other secondary effects complicate the inductor voltage waveform. The topology remains an appropriate application for the feedforward active filter scheme.

Figure 10:
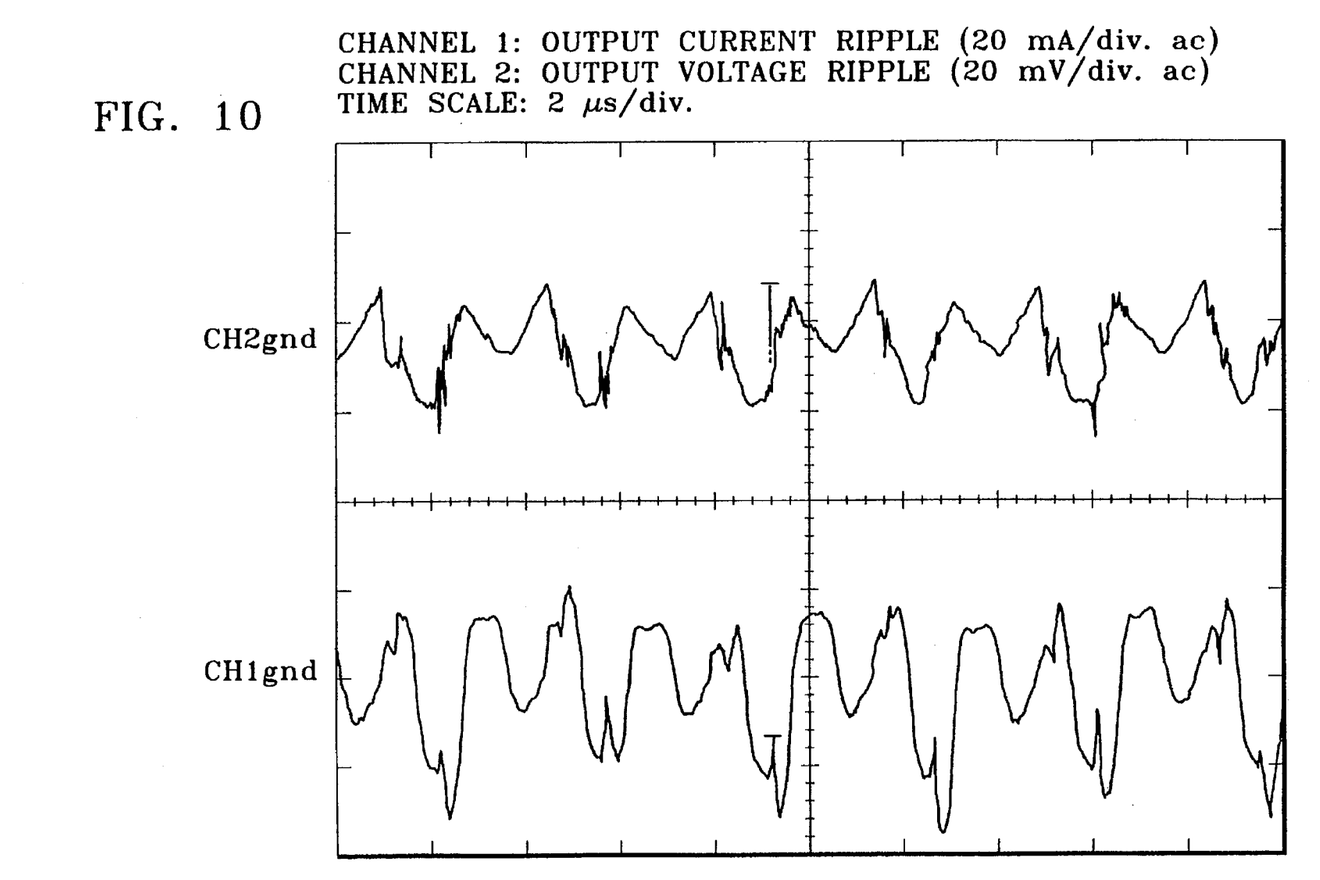
FIG. 10 is a graph of output voltage and current ripple in a push-pull converter with active filter as in FIG. 9.

FIG. 10 illustrates the output voltage and current ripple waveforms for a 48 V to 2 V forward converter with a 60 W load. If this converter is to have low ripple but fast dynamic response, an active filter is almost essential.

FIG. 10 demonstrates that 30 $mV_{p-p}$ output ripple can be achieved with the active filter in this case. Voltage ripple reduction of about 12 dB was measured at full load. Table II shows that RMS ripple is reduced to less than 8 mV over the full 0–60 W load range. The active filter in this circuit consumed a maximum of 0.45 W.

TABLE II

Output Ripple in Push-Pull Forward Converter

| Load Current (A dc) | Ripple Voltage (no active filter) | Ripple Voltage (with active filter) |
|---|---|---|
| 0 A | 9.1 $mV_{RMS}$ | 3.6 $mV_{RMS}$ |
| 3 | 9.2 | 3.8 |
| 6 | 9.4 | 3.6 |
| 9 | 9.5 | 3.4 |
| 12 | 9.9 | 3.1 |
| 15 | 10.4 | 2.9 |
| 18 | 10.9 | 2.8 |
| 21 | 11.5 | 2.8 |
| 24 | 12.1 | 2.8 |

A booster converter often does not have a series of inductors designed in the output stage. In such a topology the filtering burden is exclusively taken care of by the output capacitor.

The voltage jump across the ESR will often dominate the output ripple. An alternate scheme is to use a much smaller capacitor at the boost converter output, then add an additional LC output filter to reduce the ripple. This approach allows a wider range of tradeoffs between filter effectiveness and dynamic response. It also provides an opportunity to apply the feedforward scheme.

FIG. 2 illustrates a 12 V to 24 V boost converter, modified for an extra LC stage. The first output capacitor C1 is much smaller than normal, and displays ripple of about 2 $V_{p-p}$ at 48 W output load. As indicated in Table III, the active filter reduces voltage ripple at the output by more than 14 dB over a 0–48 W load range.

Figure 11:
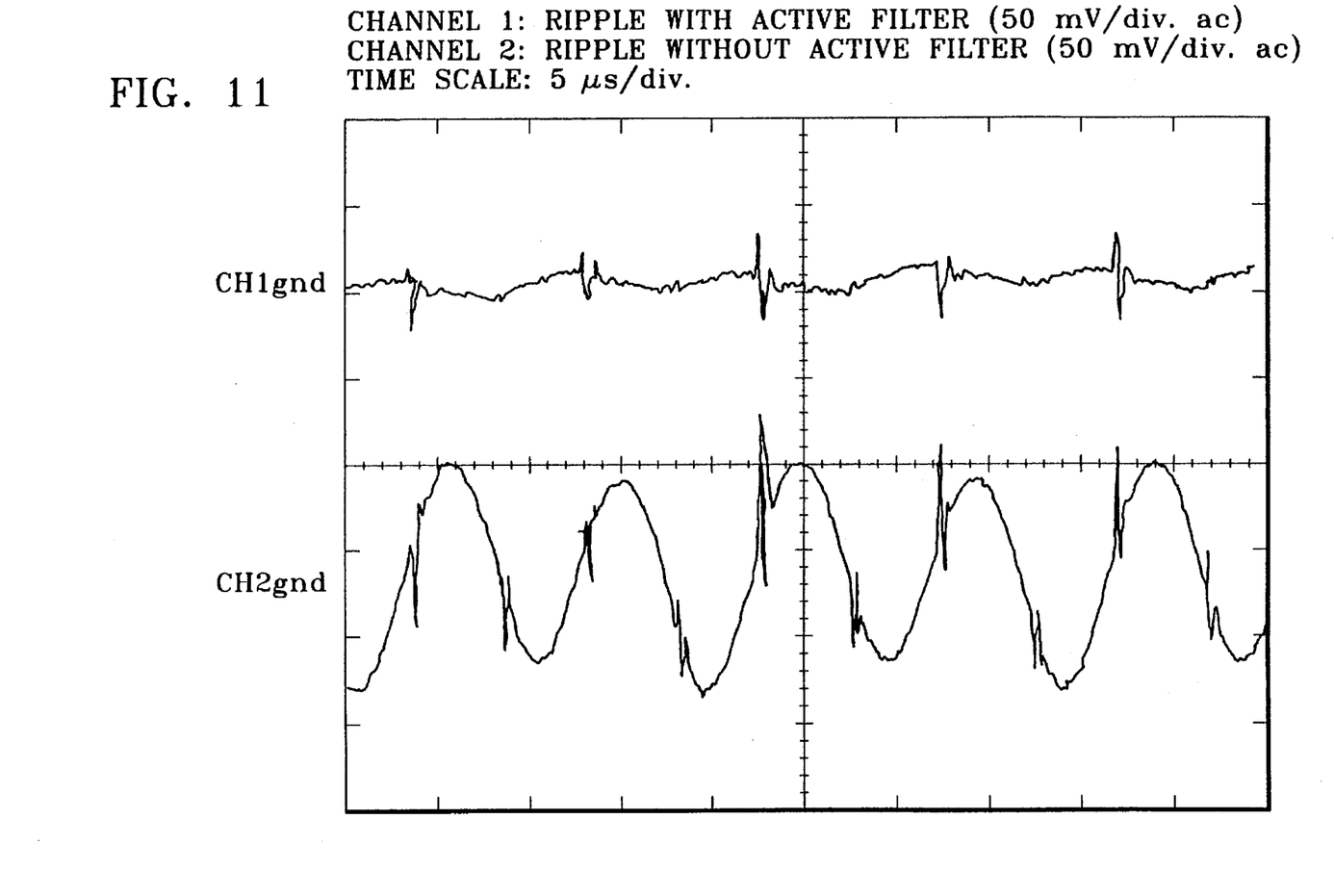
FIG. 11 compensated and uncompensated output ripple voltage for a boost converter as in FIG. 2.

Waveforms for the 24 W case are shown in FIG. 11. The inductor voltage in this case is approximately triangular, and the compensation current shape is parabolic to correct the ripple. The current is similar to what might be expected in a resonant converter. FIG. 11 illustrates bulk ripple reduction from about 130 $mV_{p-p}$ to only about 15 $mV_{p-p}$. Even when noise spikes are included, the reduction is better than 3:1. The inductor voltage is much lower than in the preceding examples, but the signal-to-noise ratio is high enough to permit some degree of ripple cancellation.

TABLE III

Output Ripple in Modified Boost Converter

| Load Current (A dc) | Ripple Voltage (no active filter) | Ripple Voltage (with active filter) |
|---|---|---|
| 0 A | 8 $mV_{p-p}$ | 3 $mV_{p-p}$ |
| 0.25 | 46 | 7 |
| 0.5 | 80 | 8 |

TABLE III-continued

Output Ripple in Modified Boost Converter

| Load Current (A dc) | Ripple Voltage (no active filter) | Ripple Voltage (with active filter) |
| --- | --- | --- |
| 0.75 | 110 | 10 |
| 1.0 | 130 | 14 |
| 1.25 | 150 | 20 |
| 1.5 | 170 | 24 |
| 1.75 | 180 | 28 |
| 2.0 | 200 | 36 |

Cancellation of output current ripple can be achieved with a feedforward technique. This feedforward active filter is applicable to a variety of power converters and current levels. It is inherently stable, and is insensitive to load levels, noise, or the nature of the converter waveforms. It has special promise for low-voltage high-current converters, in which conventional filters and previous active filter methods do not apply well.

Reduction of ripple current by more than 14 dB is readily accomplished by the method. The present adaptive tuning method accommodates variation and nonlinearity of filter inductance. It allows ripple reduction to be extended across the full load range of a given converter.

The dual of the disclosed active filter would sense current into a capacitor, and provide a series voltage compensation to correct any ripple. This structure could be used in series regulator applications.

The most limiting factors in the feedforward process are resistive drop in the inductor, inductance variation with current and temperature, and limited bandwidth of the compensation circuitry. The inductor's resistive drop means that the actual ripple current is not a true integral of the inductor voltage. It is possible to correct this effect by including a loss component in the integrator.

When the integrator time constant corresponds to the loss time constant of the inductor, the ripple current will be estimated precisely. Variation of the inductance is addressed through a tuning scheme discussed below. Bandwidth limitations are not a significant issue in 100 kHz converters, but will be important for converters switching at 500 kHz and above. Video buffer amplifiers are helpful as high-frequency compensation drivers in this context.

Secondary effects that limit performance include the nonlinear hysteresis loss of the inductor, parasitic capacitance of the inductor, and any variation in parameter values within a switching cycle. For example, the inductor used to test the buck converter in FIG. 4 had resonant frequency of 16 MHz and effective parallel capacitance of about 100 pF. This capacitance contributes less than 1 mA to the ripple current at 100 kHz.

Since the overall ripple current is on the order of 1 A in the test converter, the capacitive effect is minor. On the other hand, if the inductor is allowed to approach saturation during each switching cycle, the resulting variation in L will introduce large error in $L_{est}$. The inductor flux variation should not be excessive if the compensation method is to perform well.

Figure 12:
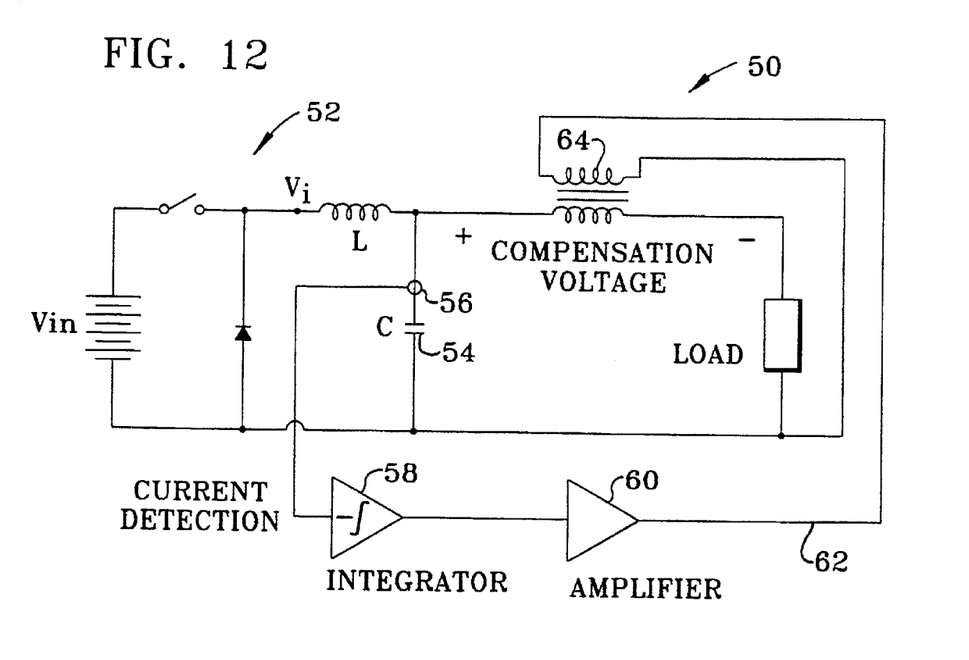
FIG. 12 is an alternate form of a feedforward active filter in accordance with the present invention.

FIG. 12 illustrates an alternate form of a converter which incorporates a feedforward active filter in accordance with the present invention. The system 50 of FIG. 12 includes a switching power converter generally indicated at 52 which incorporates a filter capacitor 54. Current into the capacitor 54 can be detected at a node 56. The detected current can be then integrated in an integrator 58. The integrated current is converted in a converter amplifier 60 to a voltage compensation signal on a line 62.

The voltage compensation signal on the line 62 can be coupled in series to a load by a coupling transformer 64. The voltage compensating signal coupled via the transformer 64 then minimizes a corresponding voltage otherwise delivered to the load.

From the foregoing, it will be observed that numerous variations and modifications may be effected without departing from the spirit and scope of the invention. It is to be understood that no limitation with respect to the specification apparatus illustrated herein is intended or should be inferred. It is, of source, intended to cover by the appended claims all such modifications as fall within the scope of the claims.

What is claimed is:

1. A switching power converter usable to deliver an ideally constant electrical energy to a load comprising:

an input stage for receiving an input signal;

means for converting said input signal into an output signal for delivering electrical energy to the load;

a filter having an energy storage element to filter said output signal prior to delivery to the load;

a sensor circuit for detecting an AC ripple signal at said energy storage element;

compensation signal generation means for determining a compensation signal based upon said AC ripple signal and a characteristic value of said energy storage element; and an energy coupling element coupled to said compensation signal generation means for providing said compensation signal to the load to minimize AC ripple in said output signal.

2. A converter as in claim 1, wherein:

said sensor circuit obtains said AC ripple signal from a load independent signal on an input side of said energy storage element.

3. A converter as in claim 2, wherein said energy storage element is an inductor and said compensation signal generation means determines a compensation current according to the following relationship:

$$i_{comp} = -1/L \int v_i dt,$$

where

L is the characteristic value of the inductor, $i_{comp}$ is the compensation current, and $v_i$ is the voltage on the input side of the inductor.

4. A converter as in claim 2, further comprising:

adaptive tuning means, feedback coupled from the load to the compensation signal generation means, for adaptively determining an operational variation in the characteristic value of the energy storage element and providing said variation to said compensation signal generation means for use in determining the compensation signal.

5. A converter as in claim 4, wherein said adaptive tuning means senses a residual AC component of a signal across the load and adjustment of the characteristic value of the energy storage element is conducted according to the polarity of a correlation product between the residual AC component and the compensation signal.

6. A converter as in claim 2, wherein said energy storage element is a capacitor and said compensation signal generating means determines a compensation voltage for providing to the load.

7. A method of minimizing ripple in electrical energy delivered to a load from an input source through a switch power converter having a passive energy device for filtering an output signal delivered to the load to produce the electrical energy, the method comprising the steps of:

sensing an AC ripple signal at the passive energy device which is indicative of an output ripple to be minimized;

generating a compensation signal based upon said AC ripple signal and a characteristic value of the passive energy device; and feeding the compensation signal to the load through an AC coupling to minimize ripple in the output signal delivered to the load.

8. A method as in claim 7, wherein said sensing step comprises detecting a load independent signal on an input side of the passive energy device indicative of said output ripple.

9. A method as in claim 8, wherein said passive energy device is an inductor and said compensation signal is a compensation current determined according to the following relationship:

$$i_{comp} = -1/L \int v_i dt,$$

where

L is the characteristic value of the inductor, $i_{comp}$ is the compensation current, and $v_i$ is the voltage on the input side of the inductor.

10. A method as in claim 8, wherein said passive energy device is a capacitor and said compensation signal is a voltage fed during said feeding step to the load.

* * * * *

UNITED STATES PATENT AND TRADEMARK OFFICE
CERTIFICATE OF CORRECTION

PATENT NO. : 5,668,464
DATED : September 16, 1997
INVENTOR(S) : Krein et al.

It is certified that error appears in the above-identified patent and that said Letters Patent is hereby corrected as shown below:

Column 1, line 38, after "2 V applications" start a new paragraph

Column 1, line 38, delete "or applications" and insert --For applications-- therefor Signed and Sealed this Fifteenth Day of September, 1998

Attest:

BRUCE LEHMAN

*Attesting Officer*        *Commissioner of Patents and Trademarks*